United States Statutory Invention Registration [19]

[11] Reg. Number: H24

Kugel et al. [45] Published: Feb. 4, 1986

[54] TOROIDAL MIDPLANE NEUTRAL BEAM ARMOR AND PLASMA LIMITER

[75] Inventors: Henry W. Kugel, Somerset; Samuel W. Hand, Jr, Hopewell Township, Mercer County; Haig Ksayian, Titusville, all of N.J.

[73] Assignee: The United States of America as represented by the United States Department of Energy, Washington, D.C.

[21] Appl. No.: 739,648

[22] Filed: May 31, 1985

[51] Int. Cl.[4] ..... G21B 1/02

[52] U.S. Cl. ..... 376/136; 376/137; 376/143; 376/146; 376/150

*Primary Examiner*—Harvey E. Behrend

*Attorney, Agent, or Firm*—Hugh W. Glenn; Robert J. Fisher; Judson R. Hightower

[57] ABSTRACT

For use in a tokamak fusion reactor having a midplane magnetic coil on the inner wall of an evacuated toriodal chamber within which a neutral beam heated, fusing plasma is magnetically confined, a neutral beam armor shield and plasma limiter is provided on the inner wall of the toroidal chamber to shield the midplane coil from neutral beam shine-thru and plasma deposition. The armor shield/plasma limiter forms a semicircular enclosure around the midplane coil with the outer surface of the armor shield/plasma limiter shaped to match, as closely as practical, the inner limiting magnetic flux surface of the toroidally confined, indented, bean-shaped plasma. The armor shield/plasma limiter includes a plurality of semicircular graphite plates each having a pair of coupled upper and lower sections with each plate positioned in intimate contact with an adjacent plate on each side thereof so as to form a closed, planar structure around the entire outer periphery of the circular midplane coil. The upper and lower plate sections are adapted for coupling to heat sensing thermocouples and to a circulating water conduit system for cooling the armor shield/plasma limiter.The inner center portion of each graphite plate is adapted to receive and enclose a section of a circular diagnostic magnetic flux loop so as to minimize the power from the plasma confinement chamber incident upon the flux loop.

1 Claim, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TOROIDAL MIDPLANE NEUTRAL BEAM ARMOR AND PLASMA LIMITER

CONTRACTUAL ORIGIN OF THE INVENTION

The United States Government has rights in this invention under Contract No. DE-AC02-76-CH03073 between the U.S. Department of Energy and Princeton University.

BACKGROUND OF THE INVENTION

This invention relates generally to nuclear fusion reactors of the tokamak type and is particularly directed to a neutral beam shield and plasma limiter for use in a tokamak fusion reactor.

Among the various approaches currently under evaluation as a potential long term source of energy produced by nuclear fusion is the magnetic confinement of an energetic plasma in the form of a toroid or "doughnut". The apparatus used in the confinement, excitation and extraction of energy from the plasma is known as a tokamak fusion reactor. A tokamak fusion reactor includes a circular arrangement of powerful magnets for generating a toroidal magnetic field wherein an energetic plasma comprised primarily of protons, deuterons, tritons and electrons is confined. The toroidally confined plasma may be energized by various means including the injection of energetic neutral particles, typically deuterium, not influenced by the magnetic field which are able to penetrate into and heat the plasma. The thermal energy thus produced within the plasma causes the nuclei therein to fuse with the release of substantial energy.

The confining magnetic field of a tokamak reactor is generally toroidal with the magnetic field lines made to spiral in the toroidal direction by a poloidal field produced by current flowing within the plasma. This plasma current can also be used to produce ohmic heating of the plasma which is generally supplemented by means of the aforementioned neutral beam injection of energetic particles to attain those temperatures necessary for the fusion of nuclei. Supplementing of the ohmic heating of the plasma with energetic neutral particles is necessary primarily due to a decrease in the resistance of the plasma with increasing temperatures.

Although the plasma of a tokamak reactor is confined by a magnetic field, the vacuum chamber within which the plasma is generated and confined typically includes various structures for defining the size and shape of the confined plasma. These structures are generally referred to as plasma limiters, or limiter blades, and they may either be fixed or movable within the vacuum chamber.

Whether stationary or movable, a plasma limiter must be capable of withstanding not only tremedous thermal loads, but also extremely large electromagnetic forces and mechanical vibrations arising from the pulsed nature in which the plasma is energized. In addition, substantial mechanical loading of the plasma limiter may result from plasma disruptions as eddy currents induced in the plasma limiter react with the rapidly changing magnetic field. These plasma limiters not only function to form the plasma in a desired shape, but also serve to shield various components within the tokamak reactor from the hostile environment within the plasma chamber. For example, various electromagnetic and thermal sensors are provided around the periphery of the plasma chamber in order to monitor the various parameters of the environment therein representing the behavior and characteristics of the heated plasma. In performing this function, the limiter must provide protection for a given sensor, while orienting and positioning the sensor for maximum sensitivity. The plasma limiter must also provide shielding for the various coils producing the confining magnetic field while allowing for their proper positioning relative to the toroidal vacuum chamber.

The present invention provides all of the aforementioned features in a toroidal midplane neutral beam armor and plasma limiter which is positioned on the inner wall of a tokamak fusion reactor for shielding a a midplane magnetic coil while allowing a magnetic flux loop sensor to be positioned in close proximity to the heated plasma. The armor shield/plasma limiter of the present invention is uniquely adapted to withstand the extreme thermal loads, electromagnetic forces, and mechanical stress present in a pulsed tokamak fusion reactor while providing the required plasma control and an ultra clean environment within the plasma chamber.

OBJECTS AND SUMMARY OF THE INVENTION

Accordingly, it is an object of the present invention to provide improved plasma confinement, reaction diagnostics and thermal isolation in a tokamak fusion reactor.

It is another object of the present invention to provide a combined neutral beam shield and plasma limiter for use in a tokamak fusion reactor wherein is magnetically confined a bean-shaped fusing plasma.

Yet another object of the present invention is to provide within the reaction chamber of a tokamak fusion reactor an inner wall thermal armor, a neutral beam shield and a large area inner toroidal plasma limiter.

A further object of the present invention is to provide a toroidal midplane plasma limiter and neutral beam armor structure for a neutral beam heated, indented, bean-shaped plasma magnetically confined in a tokamak-type fusion reactor.

A still further object of the present invention is to provide improved thermal, electromagnetic and mechanical protection and isolation in a tokamak fusion reactor.

Another object of the present invention is to provide a neutral beam armor/plasma limiting structure for use in a tokamak fusion reactor which affords improved plasma isolation and confinement, increased protection for reactor components and structure adjacent to the reactors's plasma confinement chamber, and enhanced structural integrity, reliability and safety.

Accordingly, the present invention contemplates an armor shield/plasma limiter positioned upon the inner wall of a toroidal vacuum chamber within which is magnetically confined an energetic plasma in a tokamak nuclear fusion reactor. The armor shield/plasma limiter is thus of a general semi-toroidal shape and is comprised of a plurality of adjacent graphite plates positioned immediately adjacent to each other so as to form a continuous ring upon and around the toroidal chamber's inner wall and the reactor's midplane coil. Each plate has a generally semi-circular outer circumference and a recessed inner portion and is comprised of upper and lower half sections positioned immediately adjacent to one another along the midplane of the plate. With the upper and lower half sections thus joined, a channel or duct is provided within the midplane of the plate in which a magnetic flux loop is positioned. The magnetic flux loop is thus positioned immediately adjacent to the fusing toroidal plasma and serves as a diagnostic sensor with the armor shield/plasma limiter minimizing the amount of power from the energetic plasma as well as from the neutral particle beams heating the plasma incident upon the flux loop. The outer curvature of each of the plates is selected to provide a toroidal surface which matches, as closely as practical, a selected inner limiting magnetic flux surface of the fusing plasma based upon plasma shaping considerations. The thickness of the plate is such as to minimize the distance between the midplane magnetic flux coil and the heated plasma, while maximizing the material thickness therebetween so as to provide sufficient mechanical strength and thermal isolation for the magnetic flux coil.

The upper and lower end portions of each plate are adapted for coupling to thermocouples for temperature measurements while the recessed inner portion of the graphite plate is adapted for coupling to water cooled plates by means of T-bars. The front surface of each plate is wider than its rear surface similar to the shape of a pie wedge to minimize the number of required plates while providing an approximately circular outer surface to the toroidal plasma. The armor shield/plasma limiter of the present invention is designed to withstand the thermal loads, electromagnetic forces, mechanical vibrations and duty cycle of the fusing plasma while providing plasma control and a containment-free environment within the plasma chamber.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF PREFERRED EMBODIMENT

Figure 1:
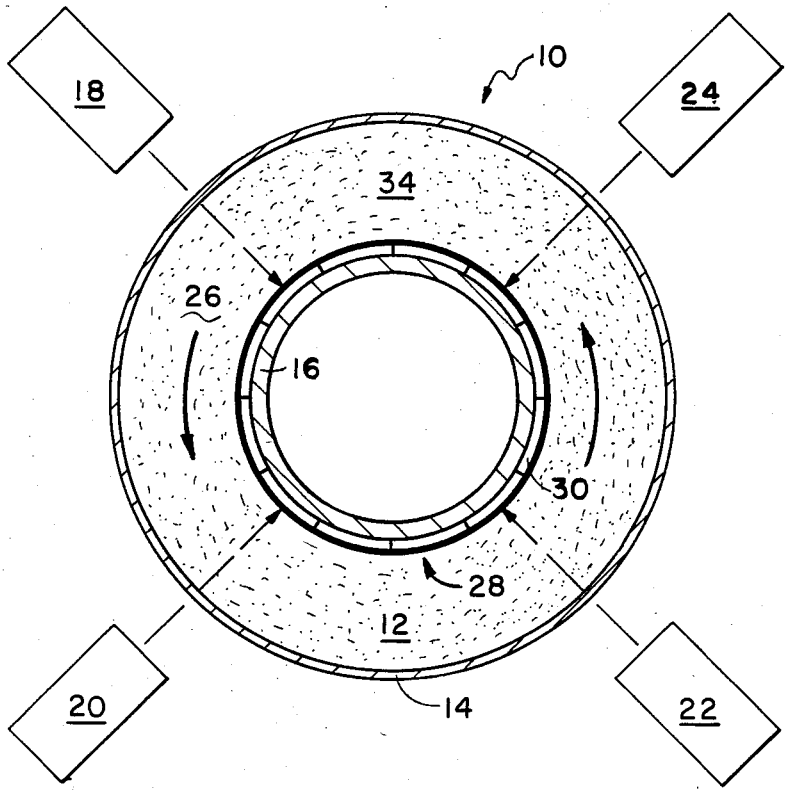
FIG. 1 is a horizontal sectional view in simplified schematic diagram form of a toroidal-shaped tokamak fusion reactor taken along the midplane thereof illustrating the position of the armor shield/plasma limiter of the present invention therein.

Referring to FIG. 1, there is shown a horizontal sectional view in simplified diagrammatic form taken along the midplane of a tokamak reactor 10 with which the armor shield/plasma limiter 28 of the present invention is intended for use. The tokamak reactor 10 includes a toroidal plasma chamber 12 defined by circular outer and inner walls 14, 16, a lower wall 34, and an upper wall which is not shown in FIG. 1. Confined within the plasma chamber 12 by means of a magnetic field is a plasma 26 comprised primarily of protons, deuterons, tritons and electrons. A toroidal magnetic field is generated by a circular arrangement of magnetic coils which are not shown in FIG. 1 for simplicity. The plasma 26 is energized by ohmic heating and by injecting neutral particles therein from a plurality of neutral beam sources 18, 20, 22 and 24. These neutral particles may be comprised of lithium atoms or helium atoms or any other similar, relatively light, neutralized atomic particles, with deuterium particles used in a preferred embodiment. The energetic plasma is typically comprised of approximately 90% deutrons and tritons and 10% helium ions. The high energies of the particles within the plasma cause the fusing of atoms, such as deuterium and tritium, and the resulting production of energy. The neutral particle beams may be directed into the energetic plasma over a wide range of orientations relative to the direction of current flow as shown by the direction of the arrows therein, with the orientation of the neutral particle beams as shown in FIG. 1 shown generally at 90° relative to the direction of current flow for illustrative purposes.

Figure 2:
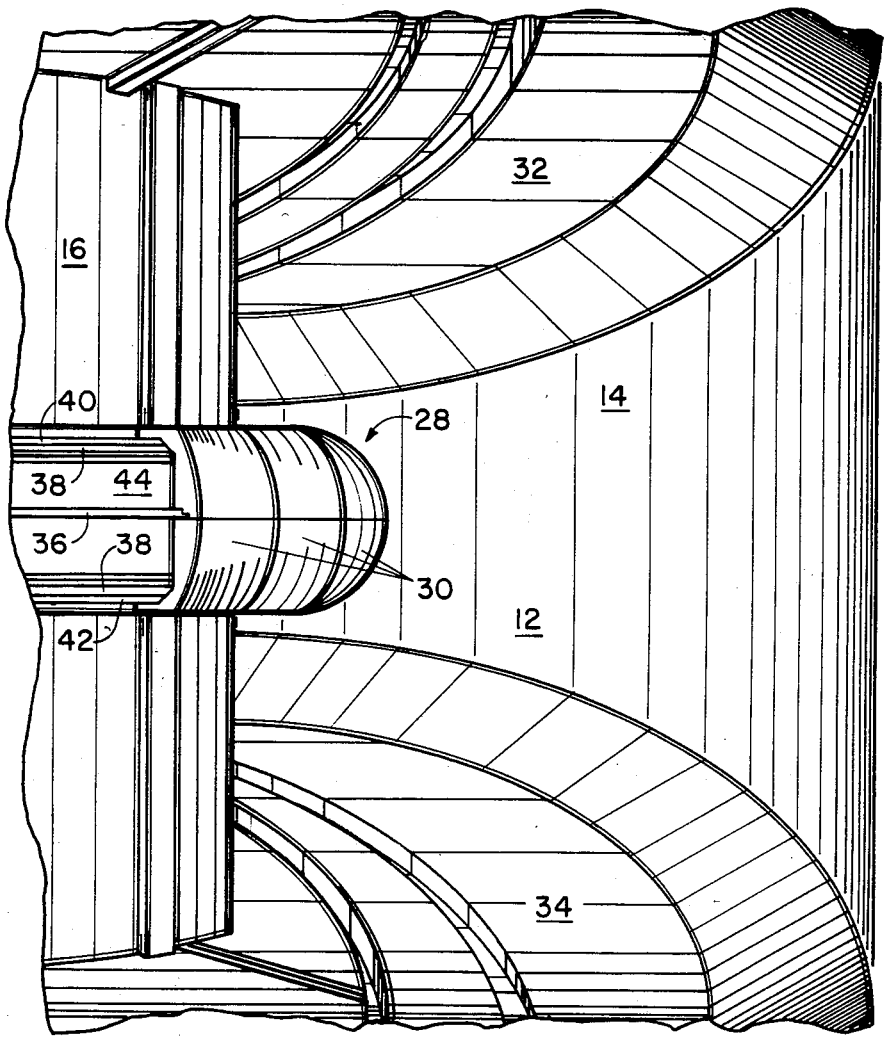
FIG. 2 is a perspective view of the toroidal plasma chamber within a tokamak fusion reactor showing the armor shield/plasma limiter of the present invention positioned therein.

Referring to FIG. 2, there is shown a perspective view of the tokamak reactor from within its toroidal plasma chamber 12. As shown in FIG. 2, the plasma chamber 12 is defined by the aforementioned outer and inner walls 14, 16 as well as upper and lower walls 32, 34 to provide a generally doughnut-shaped space within the reactor. It is within this space that the fusing plasma is confined by means of a plurality of magnetic coils oriented about the space defined by the aforementioned walls.

Various magnetic coils are positioned within and about the toroidal plasma chamber 12. One such magnetic coil is termed the midplane coil 44 which is positioned in the midplane of the plasma chamber 12 and is mounted to the inner wall 16 thereof. The midplane coil 44 is used to provide the toroidal plasma with an indented, bean-shaped cross section. Positioned immediately outward from and around the length of the midplane coil 44 is the armor shield/plasma limiter 28 of the present invention. The armor shield/plasma limiter 28 is provided with a generally circular outer surface chosen to match, as closely as practical, a selected inner limiting magnetic flux surface of the fusing plasma as determined from plasma shaping consideration. The detailed curvature of the outer surface of the armor shield/plasma limiter 28 is also a function of the design parameters of the tokamak reactor.

In a preferred embodiment, the armor shield/plasma limiter 28 is provided with a semi-circular outer surface of appropriate radius to closely approximate true tangency with the selected inner limiting magnetic flux surface thus allowing the use of conventional machining techniques during fabrication. Generally, such plasma limiters must be conditioned with high power plasma depositions for relatively long and inconvenient durations in order to render the plasma limiter suitable for limiting high temperature, low impurity plasmas. Therefore, in a preferred embodiment, the armor shield/plasma limiter surface which contacts the plasma was machined to a No. 32 finish and was mechanically worked to a relatively high polish. This procedure reduced the plasma limiter conditioning time by minimizing the number of micro-surface structures which could ablate and result in the introduction of impurities within the plasma. Thus, in a preferred embodiment, the armor shield/plasma limiter 28 is comprised of an uncoated ATJ graphite.

Also positioned on the inner wall 16 of the toroidal plasma chamber 12 are upper and lower thermocouples 40, 42 which are adapted for coupling to respective upper and lower inner ends of the armor shield/plasma limiter 28. The upper and lower thermocouples 40, 42 are responsive to the temperature of the armor shield/-plasma limiter 28. The temperature of the armor shield/plasma limiter 28, is, in turn, responsive to and provides an indication of the intensity of the neutral beam injection into the toroidal plasma chamber 12. Therefore, the upper and lower thermocouples 40, 42, while directly responsive to the temperature within the armor shield/plasma limiter 28, provide an accurate indirect measure of the neutral beam energy injected into the toroidal plasma chamber 12 for heating the magnetically confined plasma therein.

Also positioned upon and about the inner wall 16 and within the armor shield/plasma limiter 28 around the length thereof are a plurality of water cooled support plates 38. The circulating water within the water cooled support plates 38 is used to remove excess thermal energy from the armor shield/plasma limiter 28. By regulating the flow of water within the water cooled support plates 38, the temperature of the armor shield/-plasma limiter 28 may be maintained at a safe level even during plasma instabilities and with the introduction of high energies into the toroidal plasma chamber 12 by the neutral beam sources. The upper and lower thermocouples 40, 42 may be connected to the water cooled support plates 38 by a conventional flow control system (not shown) to permit the rate of flow of coolant within the support plates to be controlled in accordance with the temperature of the armor shield/plasma limiter 28. Also positioned about the inner wall 16 immediately outside of the midplane coil 44 is a toroidally symmetric, diagnostic magnetic flux loop 36 which is responsive to and provides a signal indicative of the strength of the magnetic field immediately adjacent to an inner portion of the toroidally shaped plasma. The midplane magnetic flux loop 36 is enclosed within a thin stainless steel tube and is positioned within and along the length of the armor shield/plasma limiter 28 on the midplane thereof as described in detail below.

As shown in FIG. 2, the armor shield/plasma limiter 28 is comprised of a plurality of plates 30 positioned immediately adjacent to one another in a planar, circular arrangement around the inner wall 16. Additional details of these plates 30 can be seen from FIGS. 3 and 4 which respectively show outer and inner side views of a plate 30 as used in the armor shield/plasma limiter 28 of the present invention. Each plate 30 has a generally circular outer surface and a recessed inner portion. The width of the plate 30 is such as to minimize the number of required plates positioned around the vacuum chamber's inner wall 16 while providing an approximately circular outer surface around the circumference of the armor shield/plasma limiter 28 to the toroidal plasma. Thus, the front, outer surface of each plate is wider than the rear, inner surface thereof in a manner analagous to a pie wedge.

Figure 3:
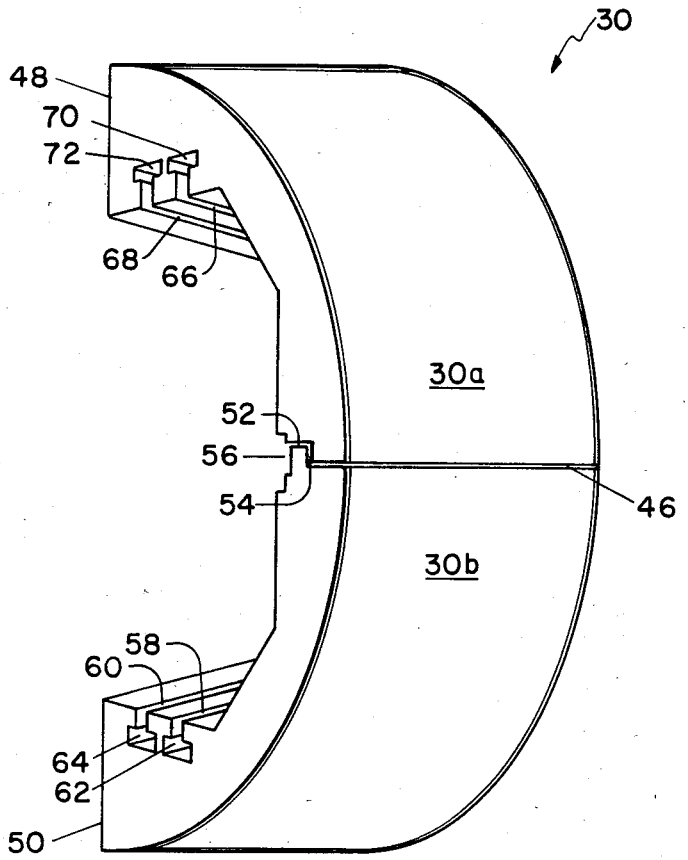
FIG. 3 is an outer side view of a plate for use in the armor shield/plasma limiter of the present invention.
Figure 4:
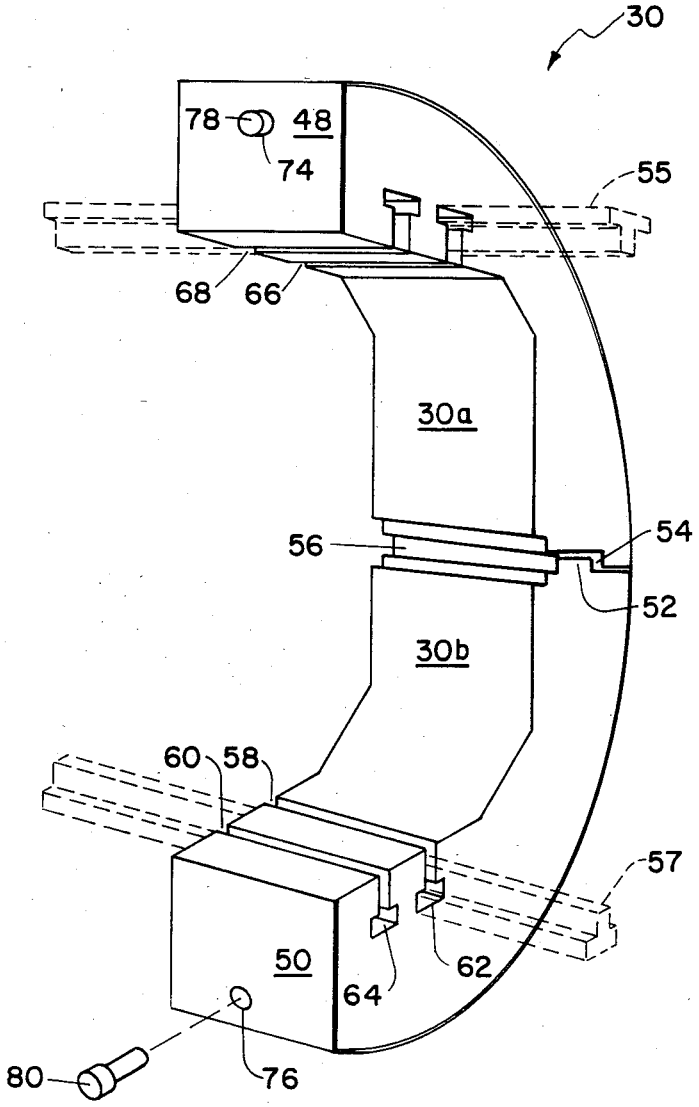
FIG. 4 is an inner side view of the plate shown in FIG. 3 as used in the armor shield/plasma limiter of the present invention.

Referring specifically to FIGS. 3 and 4, each plate 30 is comprised of an upper section **30*a* and a lower section 30*b*. The upper and lower plate sections 30*a*, 30*b* are positioned in abutting contact along the midplane of the plate 30. The region of maximum power deposition upon the plate 30 is along the midplane where the upper and lower sections 30*a*, 30*b* mate. The material thickness in the midplane region of the plate 30 is chosen so as to minimize the distance between the midplane coil, which is positioned aft or in the recessed portion of the plate 30, and the plasma, while maximizing the material thickness between the midplane coil and the plasma so as to provide sufficient mechanical strength and thermal inertia or isolation therebetween. In the region of minimum thickness of the upper and lower plate sections 30*a*, 30*b*, which is located midway between the rear and midplane portions of the plate sections, sufficient clearance is provided between the midplane coil and the armor shield/plasma limiter 28 so as to provide electrical insulation therebetween, while maximizing the thickness in these regions so as to increase heat conduction to the heat extraction regions of each plate section located adjacent to the T-slots, which are described in detail below, therein. Those portions located midway between the rear and midplane portions of each of the plate sections are also shaped so as to minimize sharp corners on the inner surface thereof in order to reduce, as much as possible, regions of high stress which could initiate and propagate a material failure under the extreme conditions within the tokamak fusion reactor. This operating characteristic is particularly important in the armor shield/plasma limiter 28** of the present invention since inner plasma limiter systems are subject to large magnetic forces and high power densities when disruptions occur in the plasma current.

Forward and aft T-slots 58, 60 are provided in the rear surface of the lower section **30*b* adjacent to the aft end thereof. Similarly, forward and aft T-slots 66, 68 are provided in the rear surface of the upper section 30*a* of the plate 30 adjacent to the aft end thereof. Each of the T-slots 58, 60, 66 and 68 is characterized as having a respective enlarged inner portion 62, 64, 70 and 72. With the various plates 30 within the armor shield/-plasma limiter 28 positioned in abutting lateral contact with adjacent plates in an aligned array, the respective T-slots of adjacent plates from continuous T-shaped channels around the entire circular length of the armor shield/plasma limiter. The continuous arrangement of T-slots within each of the upper and lower sections 30*a*, 30*b* of the plates positioned around the armor shield/-plasma limiter are adapted to receive a respective T-bar. An upper T-bar 55 is shown in dotted line form inserted within the aft T-slot 68 within the upper section 30*a* of the plate 30. Similarly, a lower T-bar 57 is shown in dotted line form positioned within the aft T-slot 60 within the lower section 30*b* of the plate 30. Similar T-bars may be positioned within the forward T-slots 58, 66 of the lower and upper sections 30*b*, 30*a***, although these T-bars are not shown in the figure for simplicity.

The T-slots in both the upper and lower sections **30*a*, 30*b* allow the plate 30 to be mounted to the water cooled support plates 38 shown in FIG. 2 by means of a plurality of T-bars. Stress calculations indicate that this manner of supporting the individual plates 30 of the armor shield/plasma limiter 28 minimizes thermal stress while providing sufficiently high thermal conductivity between the graphite plates and the aforementioned cooling plates. Each of the T-bars inserted within a respective T-slot within the plate 30 may be securely coupled to or may be a part of a respective water cooled support plate 38 which also serves to support and maintain in position the upper and lower sections 30*a*, 30*b*** of the plate.

The upper end 48 of the upper section 30*a* and the lower end 50 of the lower section 30*b* of the plate 30 are each provided with a respective aperture 74, 76 therein which is adapted to receive and engage a respective thermocouple 78, 76. Each of the thermocouples 78, 76 is responsive to the temperature within that portion of the plate 30 to which it is coupled. The upper and lower thermocouples 78, 80 are not intended to provide an indication of temperature changes after each plasma pulse within the tokamak reactor, but rather are designed to measure the effect of temperature ratcheting after a series of plasma pulses within the reactor. Temperature ratcheting is caused by the thermal build up following each successive plasma pulse within the reactor which is unable to completely dissipate this cumulative heating effect and which thus undergoes a step-like increase in temperature in responsive to a series of plasma pulses.

Referring to the midplane portion of the plate 30 as shown in FIGS. 3 and 4, a small channel or duct 54 is provided between the upper and lower plate sections 30*a*, 30*b*. This gap 54 is sized so as to provide relief for thermal expansions of those portions of the upper and lower plate sections 30*a*, 30*b* in the midplane region during maximum power deposition while minimizing the amount of power which enters the gap. A thickened portion at the lower end of the upper plate section 30*a* is thus positioned between the channel 54 and the outer, circular portion of the plate 30 which is in contact with and shapes the plasma in a bean configuration.

The channel 54 between the upper and lower plate sections 30*a*, 30*b* provides clearance for the positioning of a thin stainless steel tube (not shown) within which is positioned the toroidally symmetric, diagnostic magnetic flux loop 36. The diagnostic magnetic flux loop 36 is responsive to the charge flow within the plasma and is of critical importance for monitoring and controlling the indented, bean-shaped plasma located immediately adjacent to the outer surface of the plates 30. The overlapping of the upper plate section 30*a* of the channel 54 within which is positioned the diagnostic magnetic flux loop 36 minimizes the amount of power from the plasma chamber incident upon the flux loop. It is essential to minimize the power incident upon the diagnostic magnetic flux loop 36 because of the relatively poor thermal conductivity of the stainless steel tube enclosing the flux loop which could reach temperatures sufficiently high to damage the flux loop. The overlapping configurations of the upper and lower plate sections 30*a*, 30*b* allow the diagnostic magnetic flux loop 36 to be positioned as close to the toroidal plasma as possible while providing sufficient graphite thickness of the plate 30 between the diagnostic magnetic flux loop and the toroidal plasma for the required mechanical strength and thermal shielding. The notches 56 on the inner portion of the plate 30 adjacent to the midplane thereof provide sufficient clearance for a small bonding protrusion on the vacuum enclosure of the midplane coil 44 to which the upper and lower plate sections 30*a*, 30*b* may be securely mounted.

There has thus been shown a combined armor shield/plasma limiter for use on the inner wall of an evacuated toroidal chamber of a tokamak fusion reactor which serves to shape a fusing plasma therein in an indented, bean-shaped configuration while providing the necessary shielding for preventing neutral beam shine-through and plasma deposition upon the reactor's midplane magnetic coil. The armor shield/plasma limiter is adapted to provide an indication of the thermal energy stored in the energized plasma and to provide support and shielding for a diagnostic magnetic flux loop responsive to plasma activity within the evacuated toroidal chamber.

While particular embodiments of the present invention have been shown and described, it will be obvious to those skilled in the art that changes and modifications may be made without departing from the invention in its broader aspects. For example, while the armor shield/plasma limiter has been disclosed as comprising a plurality of connected, abutting individual plates completely surrounding the midplane magnetic coil on the inner wall of the toroidal vacuum chamber, the present invention also envisions placing only a limited number of groups of abutting armor shield/plasma limiter plates about portions of the plasma chamber's inner wall so as to shield the midplane coil from one or more neutral beam sources injecting energetic neutrals into the plasma chamber. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. In a tokamak fusion reactor having a plurality of coils including a midplane coil for generating a magnetic field within an evacuated toroidal chamber having an inner wall and wherein is confined a toroidal plasma into which is directed a beam of high energy neutral particles for energizing said plasma, said tokamak reactor further including a midplane diagnostic magnetic flux loop for analyzing said plasma, an armor shield and plasma limiter for shielding said midplane coil from said neutral particle beam and for forming said plasma into an indented, bean-shaped configuration comprising:

a plurality of plates mounted to the inner wall of the plasma chamber about at least a portion of the length thereof and positioned immediately adjacent to and around the outer periphery of the midplane coil along at least a portion of the length thereof, wherein each of said plates is positioned in lateral abutting contact with at least one other plate so as to form a generally planar, closed structure around at least a portion of the length of the midplane coil, wherein each of said plates includes:

an upper section having upper and lower end portions and including a generally one quarter circular outer portion directed toward the plasma chamber and an inner recessed portion directed toward the inner wall; and a lower section having upper and lower end portions and including a generally one quarter circular outer portion directed toward the plasma chamber and an inner recessed portion directed toward the inner wall, wherein the lower end portion of said upper section is positioned in abutting contact with the upper end portion of said lower section along the midplane of the tokamak rector so as to define a channel between said upper and lower sections within which is positioned the diagnostic magnetic flux loop and to form a generally semi-circular plate having an outer circular portion in contact with the plasma and an inner recessed portion within which is positioned the midplane coil for shielding from the neutral particle beam.

* * * * *